(12) United States Patent
Ma

(10) Patent No.: US 8,438,167 B2
(45) Date of Patent: May 7, 2013

(54) METHOD AND DEVICE FOR RECORDING MEDIA

(75) Inventor: Tao Ma, Shanghai (CN)

(73) Assignee: Huawei Device Co., Ltd, Shenzhen (CN)

( * ) Notice: Subject to any disclaimer, the term of this patent is extended or adjusted under 35 U.S.C. 154(b) by 0 days.

(21) Appl. No.: 13/173,696

(22) Filed: Jun. 30, 2011

(65) Prior Publication Data

US 2011/0282884 A1 Nov. 17, 2011

Related U.S. Application Data

(63) Continuation of application No. PCT/CN2009/072987, filed on Jul. 30, 2009.

(30) Foreign Application Priority Data

Dec. 30, 2008 (CN) .......................... 2008 1 0188862

(51) Int. Cl.
*G06F 17/30* (2006.01)
(52) U.S. Cl.
USPC ........................................................ 707/741
(58) Field of Classification Search ........... 707/741–746
See application file for complete search history.

(56) References Cited

U.S. PATENT DOCUMENTS

| 7,725,812 B1 | 5/2010 | Balkus et al. |
| 2003/0172383 A1* | 9/2003 | Takagi et al. .................. 725/89 |
| 2004/0268224 A1 | 12/2004 | Balkus et al. |
| 2006/0156219 A1 | 7/2006 | Haot et al. |

FOREIGN PATENT DOCUMENTS

| CN | 1643605 A | 7/2005 |
| CN | 1755816 A | 4/2006 |
| CN | 101051501 A | 10/2007 |
| CN | 101282445 A | 10/2008 |
| CN | 101447207 A | 6/2009 |
| CN | 101447207 B | 2/2012 |
| EP | 1 463 058 A1 | 9/2004 |
| WO | WO 01/77880 A2 | 10/2001 |

OTHER PUBLICATIONS

International Search Report, PCT/CN2009/072987, dated Nov. 5, 2009, 4 pages.
Written Opinion of the International Searching Authority, PCT/CN2009/072987, dated Nov. 5, 2009, 4 pages.
Chinese Office Action, Chinese Application No. 200810188862.6, dated Sep. 13, 2010, 6 pages.
Chinese Office Action, , Chinese Application No. 200810188862.6, dated Mar. 31, 2011, 5 pages.

* cited by examiner

*Primary Examiner* — Thu-Nguyet Le
(74) *Attorney, Agent, or Firm* — Slater & Matsil, L.L.P.

(57) ABSTRACT

A method and a device for recording media are provided. The method includes performing a media recording process. During the media recording process, periodically media index information are generated according to currently written media chunks. The generated media index information is saved.

17 Claims, 4 Drawing Sheets

METHOD AND DEVICE FOR RECORDING MEDIA

This application is a continuation of International Application No. PCT/CN2009/072987, filed on Jul. 30, 2009, which claims priority to Chinese Patent Application No. 200810188862.6, filed on Dec. 30, 2008, both of which are hereby incorporated by reference in their entireties.

TECHNICAL FIELD

The present invention relates to the field of multimedia technologies, and in particular, to a method and a device for recording media.

BACKGROUND

In recent years, various terminals with functions such as audio recording and video recording are more and more widely adopted, and user requirements for storage space of the terminals increasingly grow.

FIG. 1 is a schematic view of a storage format of a media file in the prior art, in which the media file is composed of a file header, media data, and a media index. The file header records some basic information of the media file, such as the title, producer, encoding format, and encoding rate. The encoded media data is written as chunks in the file at intervals, where each chunk represents media data within a fixed unit time (usually, 1 s). After the media data is written, an encoding program generates a media index according to the situation of writing the chunks and writes media index information to a tail of the file. The media index records information such as a storage location of each media chunk and the size of the chunk, and is an important portion for ensuring that the media file can be played normally.

The media index information is generated and saved once after the media data is written. Therefore, in order to ensure that the media index information can be saved correctly in limited storage space, before the terminal records the media, a time during which the recording is allowed is predicted according to the current available storage space. The specific prediction method is as follows: The size of the current available storage space of the terminal S is obtained (in byte, Kbyte, or Mbyte); a media encoding rate (in bit/s) is converted to storage space V required to be occupied by the media data within a unit time (in byte/s); and a maximum time T during which the media recording is allowed can be obtained by calculating S/V. During the media recording process, if the current continuous recording time reaches a threshold slightly smaller than T, the terminal automatically stops the recording operation, then generates the media index, and writes the media index to the tail of the recorded media file.

In the implementation of the present invention, the inventor finds that the prior art at least has the following problems.

For a terminal system supporting multiple tasks, other types of data writing tasks such as data downloading may be carried out during the media recording process. In this case, the change rate of the storage space may exceed expectation. If the storage space is already used up before the recording time reaches the predicted threshold, the media index information fails to be written, and the media data written earlier cannot be played normally, resulting in bad user experience.

SUMMARY OF THE INVENTION

Embodiments of the present invention provide a method and a device for recording media, which solve the problem of failing to write the media index information when the change of the storage space exceeds expectation during the media recording process.

The technical solutions according to the embodiments of the present invention are described as follows.

One aspect of the present invention provides a method for recording media, which includes: during a media recording process, periodically generating media index information according to currently written media chunks, and saving the generated media index information.

Another aspect of the present invention provides a device for recording media, which includes an index information generating unit that is configured to periodically generate media index information according to currently written media chunks during a media recording process. An index information saving unit, configured to save the media index information generated by the index information generating unit.

Through the technical solutions, during the media recording process, the media index information is periodically generated and saved. If a terminal performs other writing tasks while recording the media, even when the change of the storage space exceeds expectation and causes abnormal termination of the recording, the media data saved before the termination of the recording can be played normally, thereby ensuring the robustness of the media recording task.

DETAILED DESCRIPTION OF ILLUSTRATIVE EMBODIMENTS

An embodiment of the present invention provides a method for recording media, where the method includes: during a media recording process, periodically generating media index information according to currently written media chunks, and saving the generated media index information. The index information is not generated once and saved after the recording ends, and therefore, when the recording is terminated abnormally due to insufficient storage space, it can be ensured that media data saved before the termination of the recording can be played normally.

Embodiments of the present invention will be illustrated in the following with the accompanying drawings.

Figure 2:
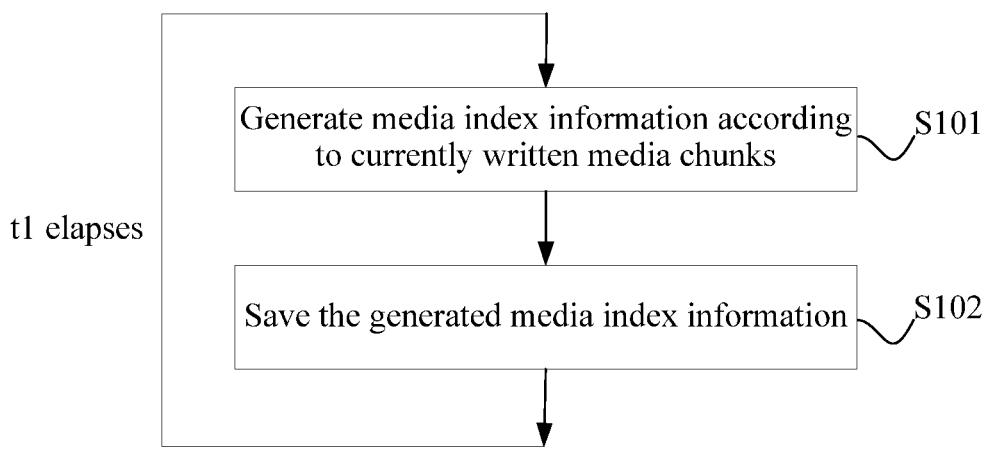
FIG. 2 is a flow chart of implementing a method for recording media according to an embodiment of the present invention.

FIG. 2 is a flow chart of a method for recording media according to an embodiment of the present invention. The method is described as follows.

S101: Generate media index information according to currently written media chunks.

S102: Save the generated media index information.

After the media recording starts, a terminal performs blocks S101 and S102 sequentially after a period t1. After S102 is performed, S101 is performed again after the period t1. This operation is repeatedly performed so that the terminal dynamically updates the media index information according to the change of media data currently written to storage space. Therefore, when the recording is terminated abnormally due to insufficient storage space, it can be ensured that the media data saved before the termination of the recording can be played normally.

Figure 1:
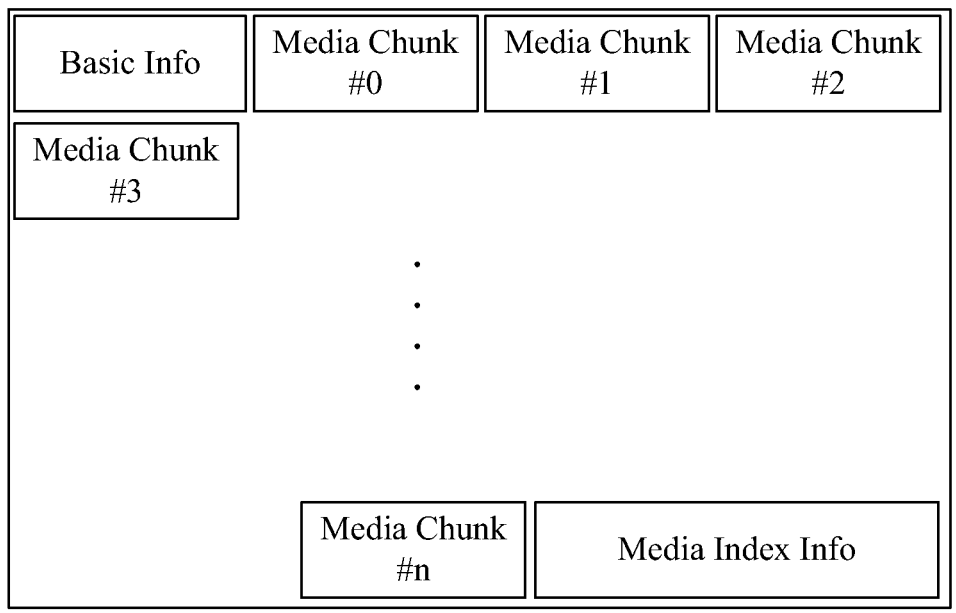
FIG. 1 is a schematic view of a storage format of a media file in the prior art.

FIG. 1 is a schematic view of a storage format of a media file in the prior art. As shown in FIG. 1, the media index information is written to a tail of the media file, that is, stored after all the media chunks. This space storage sequence is consistent with sequence in time for writing media file data in the prior art. However, if the technical solution of the present invention is applied and the space storage sequence consistent with the sequence in time for writing the media file data is still adopted, that is, every time after the period t1, the index information is written after the chunks just written in the last period, the storage locations of the chunks become discontinuous, leading to problems such as generating fragments of the storage space and affecting the data reading performance.

Figure 3:
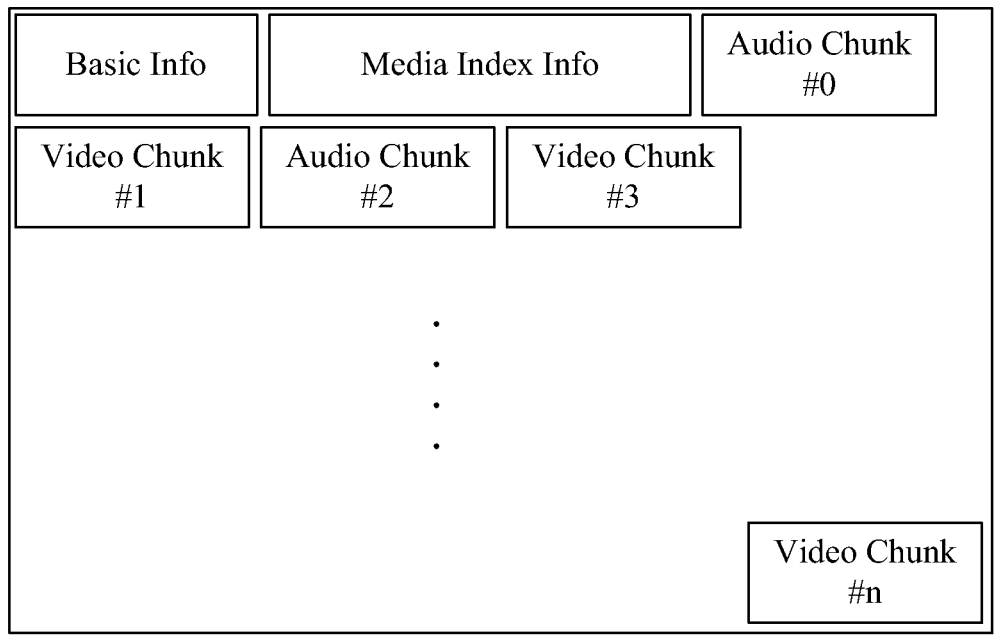
FIG. 3 is a schematic view of a storage format of a media file according to an embodiment of the present invention.

To solve the problems, in a preferred embodiment of the present invention, an optimized storage format of a media file is provided. As shown in FIG. 3, after the recording starts and before the media chunks are written, certain space for saving the media index information is first reserved, and the subsequent media chunks are written to space after reserved chunks.

Figure 4:
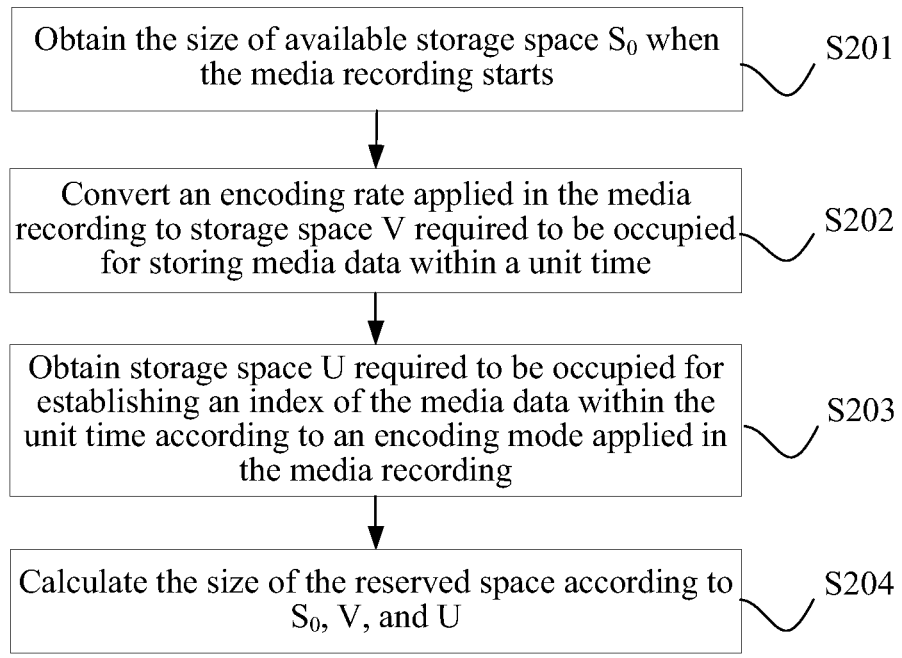
FIG. 4 is a flow chart of implementing a method for calculating the size of reserved space according to an embodiment of the present invention.

As shown in FIG. 4, the size of the reserved space can be calculated according to the following blocks.

S201: When the media recording starts, obtain the size of available storage space $S_0$.

The size of the available storage space $S_0$ is obtained when the media recording starts. The size of the storage space is generally denoted in byte, Kbyte, or Mbyte.

S202: Convert an encoding rate applied in the media recording to storage space V required to be occupied for storing media data within a unit time.

The media encoding rate is generally denoted in bps, that is, bit per second. An encoding rate is determined when the recording starts. If an encoding mode of a fixed code rate is adopted, the encoding rate is constant during encoding. While if an encoding mode of a non-fixed code rate is adopted, an average value of encoding rates needs to be determined before encoding. The value of storage space V required to be occupied for storing the media data per second (in byte/s, Kbyte/s, or Mbyte/s) can be obtained by dividing the value of the encoding rate by 8.

For example, if the media encoding rate is 128 Kbps, the size of the storage space required to be occupied for storing the media data per second is 16 Kbyte, that is, V=16 Kbyte/s.

It should be noted that, if the recorded media include both audio and video, the media encoding rate should be a sum of two encoding rates. For example, when the media is recorded, an audio encoding rate of 64 kbps and a video encoding rate of 384 kbps are adopted, and the size of the storage space required to be occupied for storing the media data per second is (64+384)/8=56 Kbyte, that is, V=56 Kbyte/s.

S203: Obtain storage space U required to be occupied for establishing an index of media data within the unit time according to an encoding mode applied in the media recording.

The size of the storage space occupied by the index of the media data depends on the number of data samples included in the media file. The media data exists in the form of chunks, in the media file and each chunk includes a certain number of samples. For each sample, when the data index is established, four types of important content, such as time stamp information of the sample, a location of the media chunk that the sample belongs to in the media file, a location offset of the sample in the chunk, and a key frame attribute, need to be saved correspondingly. If each type of content needs to occupy storage space of 4 bytes, the size of occupied index space corresponding to each sample is 16 bytes.

Generally, each chunk represents media data within a fixed unit time (usually, 1 s), and each chunk includes a certain number of samples, where the number is determined by the encoding mode applied in the media recording. For example, for an Adaptive Multi-Rate (AMR) audio encoding format, audio data in 20 ms is processed as one audio sample, so one audio chunk representing 1 s of data includes 50 audio samples. In this manner, the storage space U required to be occupied for establishing an index of the media data per second (in byte/s, Kbyte/s, or Mbyte/s) can be further obtained. For instance, in the preceding example, it can be obtained that the storage space required to be occupied for establishing an index of the AMR audio data per second is 16×50=800 bytes, that is, U=800 bytes/s.

Similar to S202, if the recorded media include both audio and video, both audio data and video data within the unit time should be considered when the occupied space is calculated. For example, during the media recording, if a Quarter Video Graphics Array (QVGA) video encoding format with 15 fps and the AMR audio encoding format are adopted, the storage space required to be occupied for establishing the index of the media data per second is 16×(15+50)=1040 bytes.

S204: Calculate $$\frac{S_0}{V} \cdot U$$

to obtain the size of the reserved space.

It can be easily seen from the foregoing block that, the value of $S_0/V$ is actually the maximum allowable recording time predicted when the recording starts, and the size of the reserved space is a value obtained by multiplying the value of $S_0/V$ by U.

For example, when the media recording starts, if the size of the available storage space $S_0$ is 100 Mbytes, U is 1040 byte/s, and V is 56 Kbyte/s, the size of the reserved space is:

$$\frac{100 \text{ Mbytes} \times 1040 \text{ bytes/s}}{56 \text{ Kbytes/s}} = 1857 \text{ Kbytes}.$$

Considering an error of the encoding mode of a non-fixed code rate, a value slightly greater than a calculation result can be taken as the size of the reserved space; for example, the value of the calculation result is increased by a certain percentage. The size of the reserved space ensures that the index information can be written correctly in the case that $S_0$ is completely used for the media recording. Moreover, the storage of the index information does not affect the continuity of writing the media chunks, thereby avoiding generating more fragments of the storage space, and reducing the impact of data writing discontinuity on the data reading performance.

In another preferred embodiment of the present invention, a utilization rate of the storage space can be further increased by dynamically adjusting the period t1. The specific solution is described in the following discussion.

It can be understood that, when the media recording just starts, if the remaining available storage space is large, the media file recorded at this time is relatively "secure", so a larger value of t1 can be selected to reduce a frequency of generating and saving the index information, so as to conserve the system resources. During the recording process, with the decrease of the available storage space, the probability of the recording task being interrupted by other data writing tasks becomes greater. At this time, the frequency of generating and saving the index information should be increased accordingly, that is, the value of t1 is decreased, so that the remaining available space can be utilized as much as possible and more valid media data can be saved.

In the method, in principle, the period t1 is adjusted according to current remaining available storage space St obtained dynamically, but in actual service operation, the relative size of the storage space should be measured according to a media encoding rate. Therefore, it is selected that t1 is adjusted according to the value of St/V. Specifically, one or more adjustment thresholds can be preset. When the value of St/V is smaller than the adjustment threshold, t1 is decreased accordingly. For example, the setting may be as follows:

when the media recording starts, t1=60 s;
when St/V<300 s, t1=30 s;
when St/V<180 s, t1=10 s;
when St/V<120 s, t1=5 s; and
when St/V<60 s, t1=2 s.

Through the foregoing setting, the value of t1 is dynamically decreased according to the decrease of the maximum allowable recording time of the current remaining available storage space St. In this case, in one aspect, when the storage space is sufficient, the system resources can be conserved with a low data operation frequency. While in another aspect, when the storage space is insufficient, the remaining available space can save more valid media data as much as possible by means of increasing the frequency of generating and saving the indexes.

Moreover, a stop threshold can be further set. When the value of St/V is smaller than the stop threshold, the media recording is stopped automatically. For instance, according to the foregoing example, the stop threshold can be set to 30 s. When the value of St/V is smaller than the threshold, it is most likely that the subsequent recording operation cannot be effectively saved. Therefore, the terminal generates the media index information according to the currently written media chunks, saves the media index information, and ends the recording task, so as to avoid subsequent possible invalid operations.

It should be noted that, the foregoing mode for setting the adjustment threshold is merely exemplary. Persons skilled in the art can adopt other threshold adjustment modes according to actual requirements. The present invention is not limited thereto.

It can be understood that, for the operation of dynamically obtaining the current remaining available storage space St, an execution period t2 also exists and can be adjusted according to a mode similar to the mode for adjusting t1. That is, the period t2 is adjusted according to the obtained current remaining available storage space St. The specific adjustment mode is similar to that of t1 and is not described herein again. It should be noted that, only when an operation frequency of dynamically obtaining the available space is not smaller than the frequency of dynamically generating and saving the index information, it can be ensured that the adjustment of t1 is timely and effective, so the value of t1 should not be smaller than the value of t2.

Persons of ordinary skill in the art should understand that, all or a part of the steps of the method according to the embodiments may be implemented by a program instructing relevant hardware. The program may be stored in a computer readable storage medium. When the program is executed, the steps of the method according to the embodiments are performed. The storage medium may be any medium capable of storing program codes, such as a Read Only Memory (ROM), a Random Access Memory (RAM), a magnetic disk, or a compact disk.

Figure 5:
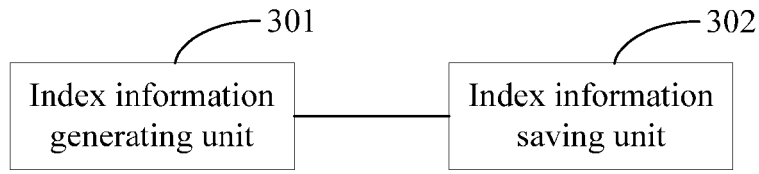
FIG. 5 is a schematic view of a first structure of a device for recording media according to an embodiment of the present invention.

Corresponding to the method in the foregoing embodiments, an embodiment of the present invention further provides a device for recording media. Referring to FIG. 5, the device for recording media includes an index information generating unit 301 and an index information saving unit 302.

The index information generating unit 301 is configured to periodically generate media index information according to currently written media chunks during a media recording process.

The index information saving unit 302 is configured to save the media index information generated by the index information generating unit 301.

Figure 6:
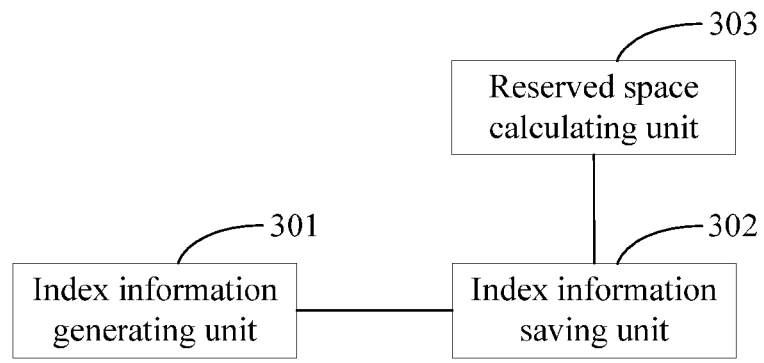
FIG. 6 is a schematic view of a second structure of the device for recording media according to an embodiment of the present invention.

Referring to FIG. 6, the device may further include a reserved space calculating unit 303.

The reserved space calculating unit 303 is configured to calculate the size of reserved space for saving the media index information before the media chunks are written.

The reserved space calculation unit specifically includes a parameter obtaining subunit and a calculation subunit. The parameter obtaining subunit is configured to obtain the size of available storage space $S_0$, convert an encoding rate applied in the media recording to the size of storage space V required to be occupied for storing media data within a unit time, and obtain the size of storage space U required to be occupied for establishing an index of the media data within the unit time.

The calculation subunit is configured to calculate $$\frac{S_0}{V} \cdot U$$

to obtain the size of the reserved space.

Figure 7:
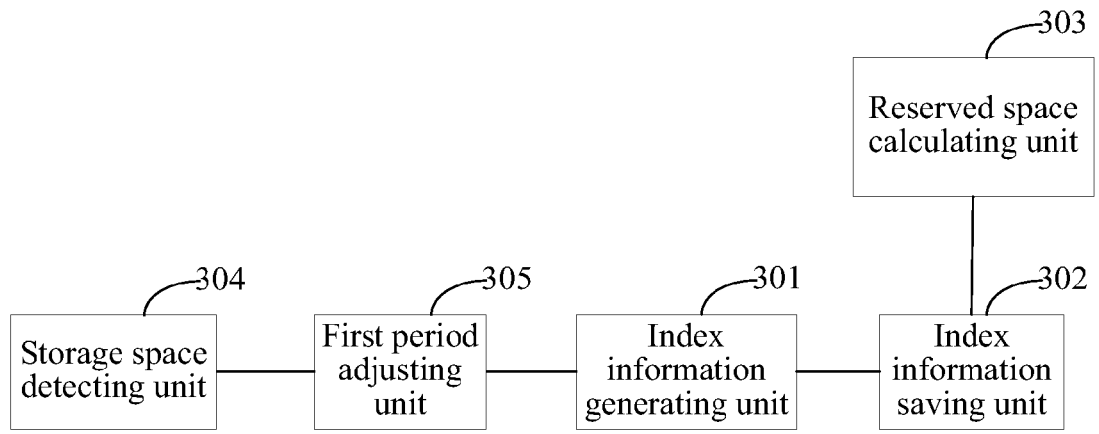
FIG. 7 is a schematic view of a third structure of the device for recording media according to an embodiment of the present invention.

Referring to FIG. 7, the device may further include a storage space detecting unit 304 and a first period adjusting unit 305.

The storage space detecting unit 304 is configured to periodically obtain the size of current available storage space St during the recording process.

The first period adjusting unit 305 is configured to adjust a period t1 for generating the media index information according to the size of the current available storage space St. The first period adjusting unit may include a first period adjusting subunit, configured to decrease the period t1 when the value of $$\frac{St}{V}$$

is smaller than a preset adjustment threshold.

Figure 8:
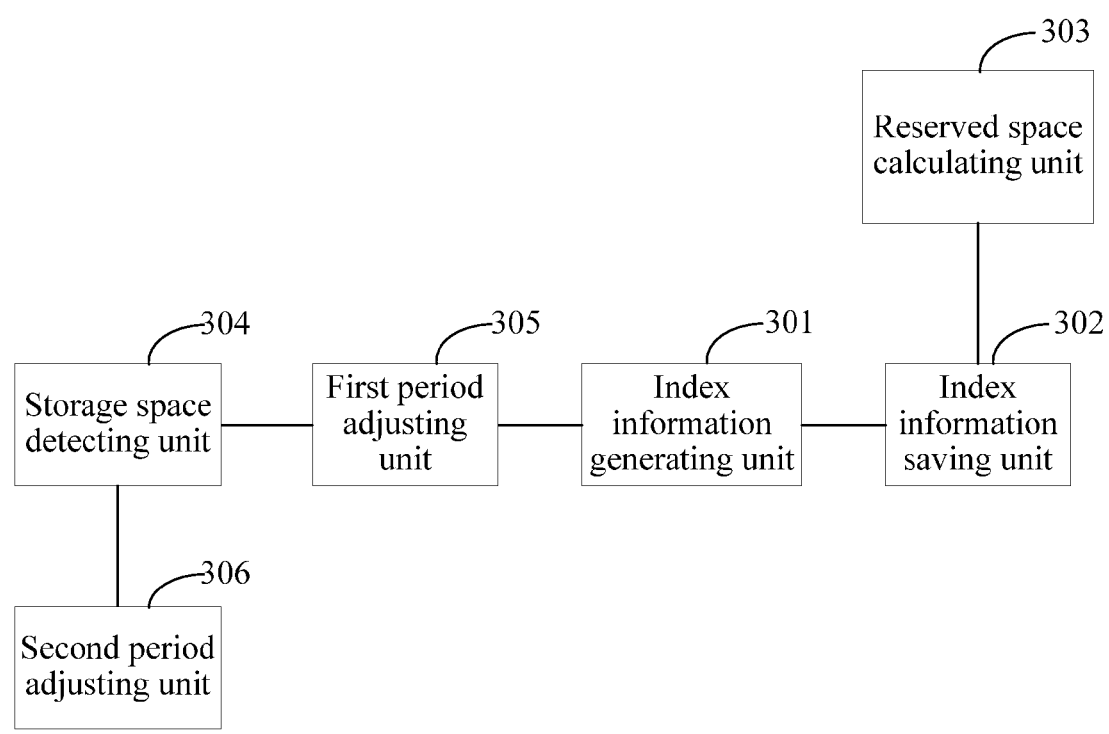
FIG. 8 is a schematic view of a fourth structure of the device for recording media according to an embodiment of the present invention.

Referring to FIG. 8, the device shown in FIG. 7 may further include a second period adjusting unit 306.

The second period adjusting unit 306 is configured to adjust a period t2 for the storage space detection unit 304 to obtain the size of the current available storage space according to the size of the current available storage space St. The second period adjusting unit may include a second period adjusting subunit, configured to decrease the period t2 when the value of $$\frac{St}{V}$$

is smaller than the preset adjustment threshold, in which t2 is smaller than or equal to t1.

The device for recording media may further include a recording stopping unit, configured to stop the media recording and instruct the index information saving unit to generate the media index information according to the currently written media chunks and save the generated media index information when the value of $$\frac{St}{V}$$

is smaller than a preset stop threshold.

Through the device for recording media, during the media recording process, the media index information is periodically generated and saved. If a terminal performs other writing tasks while recording the media, even when the change of the storage space exceeds expectation causes abnormal termination of the recording, the media data saved before the termination of the recording can be played normally, thereby ensuring the robustness of the media recording task. Furthermore, during the recording process, the period for generating the index information can be dynamically adjusted according to the size of the remaining available space. For example, when the available space is smaller than a preset threshold, the period is decreased, that is, the frequency for generating the index information is increased, so that the remaining available space can be utilized as much as possible and more valid media data can be saved.

Based on the embodiment of the method, the embodiment of the device is described simply. For the related content, reference is made to partial description of the embodiment of the method. The foregoing embodiment of the device is merely exemplary. Units described as separate components may be or may not be physically separated. Components shown as units may be or may not be physical units, that is, may be integrated or distributed to a plurality of network units. Some or all of the modules may be selected to achieve the objective of the solution of the embodiments according to actual requirements. Persons of ordinary skill in the art can understand and implement the present invention without making creative efforts.

It should be noted that the above descriptions are merely specific embodiments of the present invention, and persons of ordinary skill in the art can make various improvements and refinements without departing from the spirit of the present invention. All such improvements and refinements shall fall within the protection scope of the present invention.

What is claimed is:

1. A method for recording media, comprising:
reserving space in a storage medium for saving media index information;
performing a media recording process after reserving the space for saving the media index information;
during the media recording process, periodically generating the media index information according to currently written media chunks;
writing the media index information to the reserved space; and
calculating a size of the reserved space for saving the media index information by:
obtaining a size of available storage space $S_0$;
converting an encoding rate applied in the media recording to a size of storage space V required to be occupied for storing media data within a unit time;
obtaining a size of storage space U required to be occupied for establishing an index of the media data within the unit time according to an encoding mode applied in the media recording; and
calculating $$\frac{S_0}{V} \cdot U$$

to obtain the size of the reserved space.

2. The method according to claim 1, further comprising:
during the recording process, periodically obtaining the size of current available storage space St; and
adjusting a period t1 for generating the media index information according to the size of the current available storage space St.

3. The method according to claim 2, wherein the adjusting of the period t1 for generating the media index information according to the size of the current available storage space St comprises:
when the value of $$\frac{St}{V}$$

is smaller than a preset adjustment threshold, decreasing the period t1.

4. The method according to claim 2, further comprising:
adjusting a period t2 for obtaining the size of the current available storage space according to the size of the current available storage space.

5. The method according to claim 4, wherein the adjusting of the period t2 for obtaining the size of the current available storage space according to the size of the current available storage space St comprises:
when the value of $$\frac{St}{V}$$

is smaller than a preset adjustment threshold, decreasing the period t2, wherein t2 is smaller than or equal to t1.

6. The method according to claim 2, further comprising: when the value of $$\frac{St}{V}$$

is smaller than a preset stop threshold, stopping the media recording, generating the media index information according to the currently written media chunks, and saving the generated media index information.

7. A device for recording media, comprising:
a hardware memory comprising reserved space for saving a media index information before media chunks are written;
an index information generating unit, configured to periodically generate the media index information according to currently written media chunks during a media recording process; and
an index information saving unit, configured to write the media index information generated by the index information generating unit to the reserved space; and
a reserved space calculating unit, configured to calculate the size of reserved space for saving the media index information before the media chunks are written, wherein the reserved space calculating unit comprises:
a parameter obtaining subunit, configured to obtain the size of available storage space $S_0$, convert an encoding rate applied in the media recording to the size of storage space V required to be occupied for storing media data within a unit time, and obtain the size of storage space U required to be occupied for establishing an index of the media data within the unit time according to an encoding mode applied in the media recording; and
a calculating subunit, configured to calculate $$\frac{S_0}{V} \cdot U$$

to obtain the size of the reserved space.

8. The device according to claim 7, further comprising:
a storage space detecting unit, configured to periodically obtain the size of current available storage space St during the recording process; and
a first period adjusting unit, configured to adjust a period t1 for generating the media index information according to the size of the current available storage space St.

9. The device according to claim 8, wherein the first period adjusting unit comprises a first period adjusting subunit, configured to decrease the period t1 when the value of $$\frac{St}{V}$$

is smaller than a preset adjustment threshold.

10. The device according to claim 8, further comprising:
a second period adjusting unit, configured to adjust a period t2 for the storage space detecting unit to obtain the size of the current available storage space according to the size of the current available storage space St.

11. The device according to claim 10, wherein the second period adjusting unit comprises a second period adjusting subunit, configured to decrease the period t2 when the value of $$\frac{St}{V}$$

is smaller than a preset adjustment threshold, wherein t2 is smaller than or equal to t1.

12. The device according to claim 8, further comprising:
a recording stopping unit, configured to stop the media recording and instruct the index information saving unit to generate the media index information according to the currently written media chunks and save the generated media index information when the value of $$\frac{St}{V}$$

is smaller than a preset stop threshold.

13. A method for recording media, the method comprising:
performing a media recording process;
during the media recording process, periodically generating media index information according to currently written media chunks;
during the media recording process, periodically obtaining the size of current available storage space St;
adjusting a period t1 for generating the media index information according to the size of the current available storage space St; and
saving the generated media index information.

14. The method according to claim 13, wherein adjusting the period t1 for generating the media index information according to the size of the current available storage space St comprises when the value of $$\frac{St}{V}$$

is smaller than a preset adjustment threshold, decreasing the period t1, wherein V is a size of storage space.

15. The method according to claim 13, further comprising adjusting a period t2 for obtaining the size of the current available storage space according to the size of the current available storage space.

16. The method according to claim 15, wherein adjusting the period t2 for obtaining the size of the current available storage space according to the size of the current available storage space St comprises, when the value of $$\frac{St}{V}$$

is smaller than a preset adjustment threshold, decreasing the period t2, wherein t2 is smaller than or equal to t1, wherein V is a size of storage space.

17. The method according to claim 13, further comprising, when the value of $$\frac{St}{V}$$

is smaller than a preset stop threshold, stopping the media recording, generating the media index information according to the currently written media chunks, and saving the generated media index information, wherein V is a size of storage space.

\* \* \* \* \*